United States Patent [19]

Nagano

[11] Patent Number: 4,626,231

[45] Date of Patent: Dec. 2, 1986

[54] MOUNTING SHAFT TO PULLEY FORMED OF SHEET METAL

[75] Inventor: Satoshi Nagano, Osaka, Japan

[73] Assignee: Tsubakimoto Chain Co., Japan

[21] Appl. No.: 782,372

[22] Filed: Oct. 1, 1985

[30] Foreign Application Priority Data

Apr. 30, 1985 [JP] Japan .............................. 60-63172[U]

[51] Int. Cl.$^4$ ............................................. F16H 55/30
[52] U.S. Cl. .................................... 474/152; 474/903; 29/465
[58] Field of Search ............... 474/903, 152, 167, 166; 29/464, 465, 466; 403/259, 260, 261

[56] References Cited

U.S. PATENT DOCUMENTS

| | | | |
|---|---|---|---|
| 3,217,396 | 11/1965 | Hirtz | 403/259 X |
| 3,786,687 | 1/1974 | Gasner | 474/152 |
| 4,245,438 | 1/1981 | Van Buren, Jr. | 403/259 X |
| 4,411,639 | 10/1983 | Ruther | 474/903 |
| 4,425,816 | 1/1984 | Toyoda | 474/903 X |

Primary Examiner—Stephen J. Novosad
Assistant Examiner—Frank Mc Kenzie
Attorney, Agent, or Firm—Steele, Gould & Fried

[57] ABSTRACT

A one piece sheet metal pulley has a support structure for rigidly affixing the pulley to an end of a rotary shaft. The pulley includes a peripheral surface, a web, and a hub integrally formed of a single metal sheet. A plurality of protrusions are raised from the hub, each protrusion being a portion between two spaced slits bent upwards to hold the shaft end. The bent-up portion is contiguous with the sheet metal hub at opposite ends of the slits and is raised axially from the hub intermediate the ends, the protrusions bearing radially against the shaft adjacent the shaft end. A bolt hole is centrally provided in the hub for inserting an axial bolt through the hub and into the shaft, and a rotation preventing means having an eccentric attachment means on the hub resists relative rotation.

7 Claims, 10 Drawing Figures

MOUNTING SHAFT TO PULLEY FORMED OF SHEET METAL

BACKGROUND OF THE INVENTION

1. Field of the Invention

This invention relates to a sheet metal pulley and a means for securing the pulley to an end of a rotary shaft. In particular, the invention concerns a device in which the peripheral surface of a pulley, a web, and a hub portion for affixing the pulley to the end of the rotary shaft of the pulley according to the invention are all integrally formed of a single sheet of metal.

2. Description of the Prior Art

In a conventional installation in which an end of a rotary shaft is to be affixed to a pulley which is integrally formed from sheet metal in one piece, a hub (or boss) portion is formed into a cylindrical shape by deep drawing for the purpose of receiving the shaft end. Such an arrangement is disclosed, for example, in Japanese Patent Publication No. 35779/1981. The shaft is placed in the deep-drawn cup-shaped hub, whereby the pulley is aligned perpendicular to the axis of the shaft. The function of the drawn hub is to provide a contact area extending over the shaft end and along the axis of the shaft adjacent the end, thereby to prevent flexing of the pulley with respect to its correct perpendicular alignment.

After a thin sheet of metal is subjected to deep drawing for formation of the cylindrical configuration, the plate thickness of the cylindrical portion necessarily becomes even thinner. Therefore, when affixing an end of a shaft to the pulley, for example by inserting a locking bolt axially into the bottom of the cylindrical portion of the pulley, the bottom portion is often broken because it has been stretched too thin to bear the load to which it is subjected by the locking bolt. The strength of the walls of the cylindrical portion is also deteriorated by such drawing to the point that the walls cannot hold the peripheral surface of the shaft adjacent the end such as needed to steadily support the pulley on the shaft. The conventional apparatus for endwise affixing a shaft and a one piece pulley, characterized by these defects, is not sufficiently strong and is not satisfactory.

In some apparatus the hub portion of a sheet metal pulley is provided with a claw piece which is cut away and raised by one end in the axial direction such as to fit around the outer peripheral surface of the shaft end at a point axially spaced from the web of the pulley. This is disadvantageous in that the distal end of the raised claw piece is free and can be easily displaced from the shaft. Therefore, the pulley and shaft are not as rigidly and permanently affixed as they could be. The strength of attachment needed for steadily and securely holding the shaft end under loads is lacking in this apparatus as well.

In yet another known apparatus the hub portion is composed of two stacked plates in order to increase the length of axial support for the pulley and to improve the strength of the shaft end installation. This is unnecessarily expensive in both material and assembly requirements.

SUMMARY OF THE INVENTION

It is an object of the invention to provide secure attachment of a sheet metal pulley to a rotary shaft, without unnecessarily adding to the pulley's expense.

It is also an object to provide a structure of struck-up support tabs for a pulley in which each tab is rigidly affixed to the pulley.

The present invention provides a pulley optionally adapted for installing a rotary shaft to the pulley in which the peripheral surface of the pulley, a web, and a hub portion to be affixed to the end of the rotary shaft of the pulley are integrally formed in a single sheet of metal to include a plurality of protrusions each of which consists of an upwardly or axially displaced portion defined between spaced slits in the hub portion, the protrusions to bear radially against the shaft at points axially spaced from the end. A bolt hole is preferably provided along the axis of the hub portion for the purpose of receiving a bolt secured to the shaft end. A rotation prevention means is eccentrically provided on the hub portion, adapted to prevent the relative rotation of the shaft end and the pulley.

Due to the plurality of rigidly-made protrusions around the circumference of the hub portion of the pulley, enclosing and holding the outer periphery of the shaft end portion, the pulley is attached to the shaft along an axial span, whereby the attachment is secure against pulley misalignment under load. This structure precludes the need that the hub portion, apart from the protrusions, be made thinner. Therefore, the strength for holding the shaft end need not be thereby reduced. The structure also precludes the need to add thicknesses to the hub of the one-piece pulley. The protrusions accurately locate the shaft end at a central aligned position and hold it steadily.

BRIEF DESCRIPTION OF THE DRAWINGS

There are shown in the drawings the embodiments which are presently preferred. It should be understood that the invention is not limited to the precise arrangements, features and combinations illustrated, the details of which are subject to additional embodiments and various combinations and groupings.

FIG. 1 is a sectional view of a pulley taken perpendicular to its axis, the shaft and a connecting bolt being shown in phantom;

FIG. 2 is an elevation view of the pulley taken from the right side with respect to FIG. 1; and FIG. 3 is an enlarged section view of the protrusions.

FIG. 4 is an elevation view of the slits showing the arrangement thereof;

FIG. 5 is a section view of the slits taken along the line V—V in FIG. 4;

FIGS. 6 and 7 are section views of a protrusion for illustrating the process for forming the protrusion with a stepped portion;

FIG. 8 is a section view of the right half of the pulley in the second embodiment; and FIGS. 9 and 10 are elevation views of other examples of the configuration of the slits.

DESCRIPTION OF THE PREFERRED EMBODIMENTS

Figure 1:
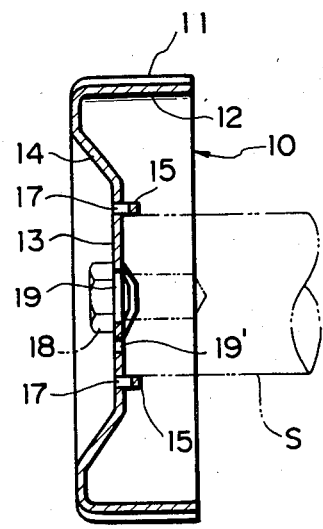
FIGS. 1 to 3 show a first embodiment of the invention.
Figure 2:
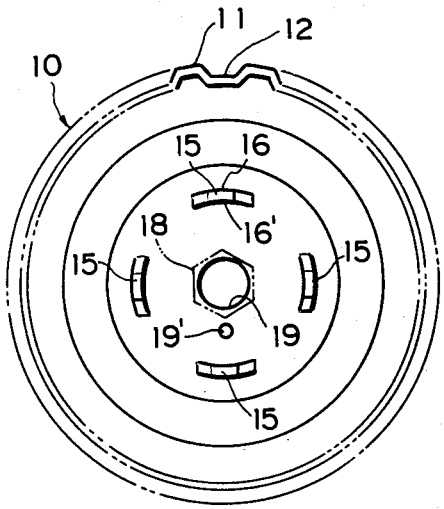
Figure 3:
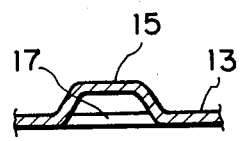

FIGS. 1 to 3 show a first embodiment of a pulley of sheet metal according to the invention. As is shown in FIG. 1, a peripheral portion 12, for example with a plurality of splines or teeth 11 formed on the outer peripheral surface thereof, and a hub portion 13 for affixing the pulley to the end of a rotary shaft S, are connected through a web 14 and integrally formed together of a single thickness of sheet metal.

The hub portion 13 has a surface which is disposed axially against the shaft end portion, and a plurality of frusto-conical sheet metal protrusions 15. The protrusions each bear radially against the shaft, and together they enclose and fit over the outer peripheral surface of the shaft adjacent its end. Including the surface of the hub, a structure is thereby defined to rigidly grasp all around the shaft end. The protrusions define an annular projection on the hub portion 13. Each protrusion 15 extends in a circumferential direction around the shaft end portion and is wider adjacent its base. The protrusions are struck up from the hub such that each end of each protrusion 15 is continguous with the hub portion 13, as is shown in FIG. 3.

The radially-inward facing surface of each protrusion 15, against which the outer periphery of the shaft end portion rests, is preferably formed to be arcuate in precise conformity with the configuration of the outer peripheral surface of the shaft end portion, whereby the shaft end portion can be tightly inserted into the space between protrusions 15 to achieve accurate positioning of the pulley in the radial direction.

Each protrusion 15 is formed by a process of first notching out two slits 16, 16' with a punch and a die which are finished to a predetermined dimension, and next deforming the portion between the slits in the axial direction from the hub to form a protrusion or bearing piece axially displaced from the hub but also attached thereto. In this way, the hole indicated by reference numeral 17 is punched.

In the central portion of the hub portion 13 a bolt hole 19 is formed, for receiving bolt 18 for rigidly affixing the pulley 10 to the shaft end. A rotation-stop knock pin hole 19' is also preferably formed at a position eccentric from hole 19. The knock pin hole can receive a projection of the shaft or a pin or screw can be inserted to check relative rotation of the pulley 10 and the shaft end portion under loads that might otherwise tend to loosen bolt 18.

Additional or alternative means for providing a restriction against relative rotation of the pulley and shaft may be provided. For example, a rigid or concavo-convex portion (not shown) may be formed to be engaged with complementary shapes on either the shaft end surface or the peripheral surface of the shaft end portion, connecting them at an eccentric location to the hub portion.

FIGS. 4 to 10 show a second embodiment of the invention. While the center line of the two slits 16, 16' is disposed in the circumferential direction in the first embodiment, two slits 26, 26' are arranged in FIGS. 4 to 10 such that the center line thereof is oriented in the radial direction. In both embodiments, the protrusions define contact edges adapted to bear radially against the outer periphery of the shaft adjacent the end of the shaft.

It is evident that since the shaft end portion is disposed at an angle of 90 degrees in relation to the hub portion, each protrusion 25 is formed to have a complementary stepped portion for engaging with the shaft end portion. In particular, the stepped portion is oriented at an angle of about 90 degrees to the hub surface in section as viewed along the center line of the slits 26, 26'. The edge of the stepped out portion that contacts the shaft may be either an edge formerly disposed at a slit as in FIGS. 1 to 3, or an edge formed in the surface part of the protrusion when the same is struck up, as in FIGS. 4 to 10.

Figure 6:
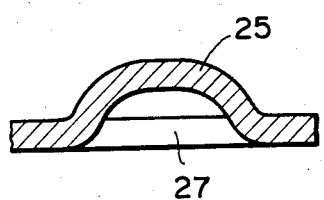
Figure 7:
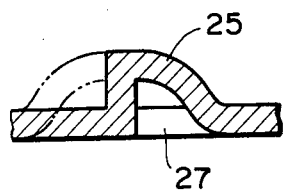

FIGS. 6 to 7 show the process of machining steps for forming a stepped protrusion 25 as shown in FIGS. 4 to 10. In the first stage a protrusion defining a truncated conical form similar to that of the first embodiment is formed, as is shown in FIG. 6. In the second stage the portion against which the shaft end portion will bear is formed into a configuration having a 90-degree bend, as is shown in FIG. 7. It is naturally possible to combine these two stages into one step by striking the slit hub with a tool of complementary shape to the desired configuration with the 90-degree bend.

The height of the protrusion is preferably about 1.5 times the plate thickness, and the width and the length of the slits can be determined appropriately.

Figure 8:
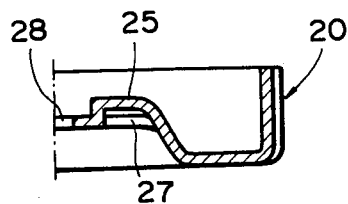

FIG. 8 shows an example of the section of the pulley 20 in the second embodiment, wherein the reference numeral 27 denotes a hole left underneath a struck-up protrusion 25, and 28 denotes the central bolt hole.

Figure 4:
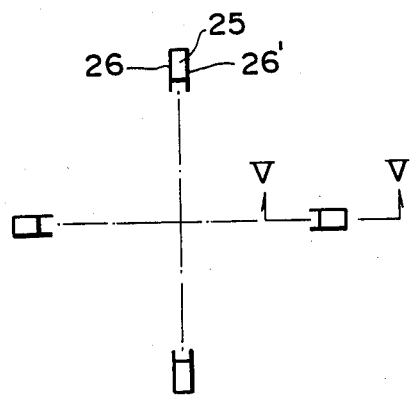
FIGS. 4 to 10 show a second embodiment of the invention.
Figure 5:
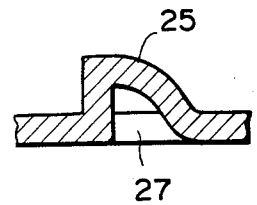
Figures 9, 10:
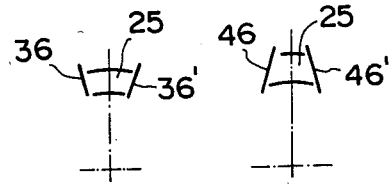

It is not absolutely necessary to provide two slits in parallel, as is shown in FIG. 4. It is also possible to provide slits which diverge toward the outer periphery, as is shown by slits 36, 36' in FIG. 9, or slits 46, 46' which converge toward the outer periphery, as is shown in FIG. 10.

According to the first embodiment of the invention, since a plurality of protrusions for enclosing and holding the outer periphery of the shaft end portion are disposed around the circumference of the hub portion of the pulley, each being struck up from the hub portion, the plate thickness of the hub portion apart from the protrusions is not reduced as a result of the formation of the protrusions. Furthermore, since the end portion of each protrusion is not a movable free end, each protrusions instead being a bow having its ends contiguous with the hub portion, the protrusions locate the shaft end portion at the exact center position and hold it rigidly aligned, without any reduction in the strength of attachment of the pulley and the shaft end portion as a result of their use. In addition, the punching process for making the protrusions on the hub portion is very easy and inexpensive, and can be combined with other steps in the manufacture of the pulley.

According to the second embodiment of the invention, since the slits defining the projections are oriented in the radial direction, the direction of the slits and the contiguous material between the slits is orthogonal to the rotary direction of the pulley (i.e., the direction in which torque is transmitted). Torque forces are therefore born substantially along the material of the protrusions rather than across the bends therein. Accordingly, this embodiment is especially effective in preventing the pulley mounting structure from being broken due to weakening of the hub by the slits and due to stress on the protrusions.

In terms of the configuration of the protrusions, it is considered that each protrusion serves as an elastic member in relation to applied force. The protrusions have an effective damping capability in relation to high loads and load fluctuation.

The invention having been disclosed, additional variations within the scope of the invention may now be apparent to persons skilled in the art. Reference should be made to the appended claims rather than the foregoing specification as indicating the true scope of the invention.

What is claimed is:

1. A pulley to be rigidly affixed to an end of a rotary shaft defining an axis, the pulley comprising:
    a peripheral surface, a web, and a hub integrally formed of a single metal sheet, the hub having a central bolt hole for inserting an axial bolt through the hub and into the shaft;
    a plurality of protrusions on the hub, each having a portion defined between two slits in said hub, said portion being contiguous with the hub at opposite ends of the slits and raised axially from the hub intermediate said opposite ends, the protrusions bearing radially against the shaft adjacent said end; and,
    a rotation preventing means for preventing relative rotation of said shaft and said pulley, having an eccentric attachment means on said pulley.

2. A pulley according to claim 1, wherein said two slits define a center line oriented in a circumferential direction around the axis.

3. A pulley according to claim 1, wherein said two slits define a center line oriented in a radial direction with respect to the axis.

4. A pulley according to claim 1, wherein said protrusions define struck-up bows having ends contiguous with the hub.

5. A pulley according to claim 4, wherein said bows are truncated conical forms in section.

6. A pulley according to claim 2, wherein said protrusions have edges parallel to the slits, bearing against the shaft along an axial space from the end of the shaft.

7. A pulley according to claim 3, wherein said protrusions have surfaces perpendicular to the slits, bearing against the shaft along an axial space from the end of the shaft.

* * * * *